United States Patent
Liu et al.

(10) Patent No.: US 10,693,131 B2
(45) Date of Patent: Jun. 23, 2020

(54) COMPOSITE FOR CATHODE OF LI-ION BATTERY, ITS PREPARATION PROCESS AND THE LI-ION BATTERY

(71) Applicant: Farasis Energy (Ganzhou) Co., Ltd., Ganzhou (CN)

(72) Inventors: Hongjian Liu, Hercules, CA (US); Keith D Kepler, Hercules, CA (US); Robbert M. Vermeulen, Pleasant Hill, CA (US); Floris Tsang, Walnut Creek, CA (US); Phillip Hailey, Oakland, CA (US); Michael Slater, Oakland, CA (US)

(73) Assignee: FARASIS ENERGY (GANZHOU) CO. LTD., Ganzhou (CN)

( * ) Notice: Subject to any disclaimer, the term of this patent is extended or adjusted under 35 U.S.C. 154(b) by 170 days.

(21) Appl. No.: 15/895,233

(22) Filed: Feb. 13, 2018

(65) Prior Publication Data
US 2018/0248180 A1    Aug. 30, 2018

Related U.S. Application Data

(60) Provisional application No. 62/143,172, filed on Feb. 24, 2017.

(51) Int. Cl.

| | | |
|---|---|---|
| H01M 4/36 | (2006.01) | |
| H01M 4/525 | (2010.01) | |
| H01M 4/04 | (2006.01) | |
| H01M 4/131 | (2010.01) | |
| H01M 4/1315 | (2010.01) | |
| H01M 4/1391 | (2010.01) | |
| H01M 4/13915 | (2010.01) | |
| H01M 4/505 | (2010.01) | |
| H01M 4/48 | (2010.01) | |
| H01M 4/13 | (2010.01) | |
| H01M 4/139 | (2010.01) | |
| H01M 4/62 | (2006.01) | |
| H01M 4/02 | (2006.01) | |
| H01M 10/0525 | (2010.01) | |

(52) U.S. Cl.
CPC ......... *H01M 4/366* (2013.01); *H01M 4/0402* (2013.01); *H01M 4/0471* (2013.01); *H01M 4/13* (2013.01); *H01M 4/131* (2013.01); *H01M 4/139* (2013.01); *H01M 4/1315* (2013.01); *H01M 4/1391* (2013.01); *H01M 4/13915* (2013.01); *H01M 4/483* (2013.01); *H01M 4/505* (2013.01); *H01M 4/525* (2013.01); *H01M 4/62* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2010/0301284 A1* 12/2010 Suzuki ............... H01G 11/46
 252/520.1
2011/0200880 A1* 8/2011 Yu ..................... H01M 4/505
 429/223

* cited by examiner

*Primary Examiner* — Wojciech Haske
(74) *Attorney, Agent, or Firm* — Volpe and Koenig, P.C.

(57) ABSTRACT

A composite for the cathode of Li-ion battery is disclosed and comprises: a base active material represented by $Li_{1+a}(N_{1-b-c}Co_bMn_c)O_2$ wherein $0 \leq a \leq 0.5$, $0 \leq b \leq 0.4$, $0 \leq c \leq 0.6$, with $b+c<1$; and a coating on the base active material comprising a phase containing the components $B_2O_3$ or $SnB_xO_{2+3x/2-y/2}F_y$; wherein $0 \leq x \leq 5$, $0 < y < 4+3x$; wherein relative to the total amount of the base active material, the weight percentage of B element is not more than 2 wt %, the weight percentage of Sn element is not more than 5 wt %. A method for making a composite is disclosed and includes: mixing the base active material with the phase components and/or a precursor for the phase components; and firing the mixture obtained. The application provides a high capacity, long cycle life cathode material that is stabilized at high voltages.

18 Claims, 5 Drawing Sheets

COMPOSITE FOR CATHODE OF LI-ION BATTERY, ITS PREPARATION PROCESS AND THE LI-ION BATTERY

CROSS-REFERENCE TO RELATED APPLICATIONS

The present non-provisional application claims the benefits of the U.S. provisional application Ser. No. 62/463,172 filed on Feb. 24, 2017 which is incorporated by reference herein in its entirety.

TECHNICAL FIELD

The present invention relates to the field of Li-ion battery, in particular to a composite for cathode of Li-ion battery, its preparation process and the Li-ion battery.

BACKGROUND

A number of cathode materials for Li-ion batteries are capable of providing very high capacity when charged to voltages greater than the standard 4.2 V vs. lithium metal. For many cathode materials, the higher the charging cut-off voltage, the more lithium that can be removed from the cathode material per unit weight. Unfortunately many cathode materials in these high states of charge can be reactive towards the electrolyte, resulting in surface reactions that can damage the cathode material and consume the electrolyte. This results in accelerated capacity loss and impedance build-up, greatly shortening the life of a Li-ion cell using these materials at such high voltages. Thus it is desirable to provide high voltage capable cathode materials that are stabilized to the electrolyte at high voltages to enable the construction of long life, very high capacity, high voltage Li-ion cells. One approach to improve the stability of these materials is to coat the surface of the active cathode materials with a phase that is more stable to the electrolyte at high voltages.

Typically these materials are oxides, fluorides, or mixed oxide/fluorides of early transition metals, post-transition metals, and semi-metals ($AlF_3$, $Al_2O_3$, etc.). Materials known as solid state Li-ion conductors (LLTO, etc.) are also used as coatings and are particularly beneficial in maintaining good C-rate capability in these devices. Introduction of a coating typically increases cell resistance through increased charge transfer resistance, electronic resistance, or both. In addition to careful selection of coating materials based on chemistry and manufacturing concerns, optimization of the amount of the coating material relative to the base material is critical in creating useful batteries with improved performance. Thus a high capacity, long cycle life cathode material that is stabilized at high voltages is highly desirable.

SUMMARY

In an embodiment, the present invention provides a composite for the cathode of a Li-ion battery comprising:

a base active material represented by $Li_{1+a}(Ni_{1-b-c}Co_b Mn_c)O_2$ wherein $0 \leq a \leq 0.5$, $0 \leq b \leq 0.4$, $0 \leq c \leq 0.6$, with $b+c<1$; and a coating on the base active material comprised of a phase containing the components $B_2O_3$ or $SnB_xO_{2+3x/2-y/2}F_y$; wherein $0 \leq x \leq 5$, $0 < y < 4+3x$;

wherein relative to the total amount of the base active material, the weight percentage of B element is not more than 2 wt %, the weight percentage of Sn element is not more than 5 wt %.

Preferably, the coating on the base active material comprised of a phase containing the components $SnB_xO_{2+3x/2-y/2}F_y$; wherein $0<x \leq 5$, $0<y<4+3x$; relative to the total amount of the base active material, the weight percentage of Sn element is 0.2 wt % to 1.2 wt %, more preferably is 0.2 wt % to 0.8 wt %, still more preferably is 0.45 wt % to 0.75 wt %, most preferably is 0.6 wt %; the weight percentage of B element is 0.08 wt % to 0.5 wt %, more preferably is 0.08 wt % to 0.16 wt %, still more preferably is 0.1 wt % to 0.14 wt %, most preferably is 0.12 wt %.

Preferably, the coating on the base active material comprised of a phase containing the components $SnB_xO_{2+3x/2-y/2}F_y$; wherein $0<x \leq 5$, $0<y<4+3x$, relative to the total amount of the base active material, the weight percentage of Sn element to the weight percentage of B element is 3:0.1-1.35, more preferably is 3:0.4-1.25, still more preferably is 3:0.4-0.8, most preferably is 3:0.6.

Preferably, relative to the total amount of the base active material, the content of the coating is 0.1 wt % to 3 wt %, more preferably is 0.2 wt % to 1.7 wt %, still more preferably is 0.6 wt % to 0.8 wt %, most preferably is 0.72 wt %.

In another embodiment, the present invention provides a method for making the composite of the present invention including the steps of:

(1) mixing the base active material with the phase components and/or a precursor for the phase components; and (2) firing the mixture obtained in step (1).

Preferably, in step (1) the mixing may be dry mixing.

Preferably, in step (1) the mixing may be performed in a solvent which may be selected from water and methanol.

Preferably, in step (1) the mixing is performed in the presence of a milling media, the milling media is preferably zirconia.

Preferably, in step (1) the precursor of $B_2O_3$ is at least one of $H_3BO_3$ and $HBO_2$.

Preferably, in step (1) the precursor of $SnO_{2-y/2}F_y$ is $SnF_2$, in this case, $0<y \leq 2$.

Preferably, in step (1) mixing the base active material with $B_2O_3$ or a precursor of $B_2O_3$ for 20-40 min to obtain a mixture first, and then mixing the mixture with $SnO_{2-y/2}F_y$ or a precursor of $SnO_{2-y/2}F_y$ for 1 hour to 3 hours.

Preferably, in step (2) the firing is performed at a temperature of 400° C. to 600° C. for 4 hours to 6 hours.

In still another embodiment, the present invention provides a Li-ion battery comprising a cathode, an anode and a separator sandwiched therebetween wherein the cathode contains a composite for the cathode of Li-ion battery comprising:

a base active material represented by $Li_{1+a}(Ni_{1-b-c}Co_b Mn_c)O_2$ wherein $0 \leq a \leq 0.5$, $0 \leq b \leq 0.4$, $0 \leq c \leq 0.6$, with $b+c<1$; and a coating on the base active material comprised of a phase containing the components $B_2O_3$ or $SnB_xO_{2+3x/2-y/2}F_y$; wherein $0 \leq x \leq 5$, $0<y<4+3x$;

wherein relative to the total amount of the base active material, the weight percentage of B element is not more than 2 wt %, the weight percentage of Sn element is not more than 5 wt %.

Except that the composite of the present invention is used as cathode active material, the battery of the present invention may be prepared according to the conventional process in this art.

The present application provides a high capacity, long cycle life cathode material that is stabilized at high voltages.

DETAILED DESCRIPTION

Figure 1:
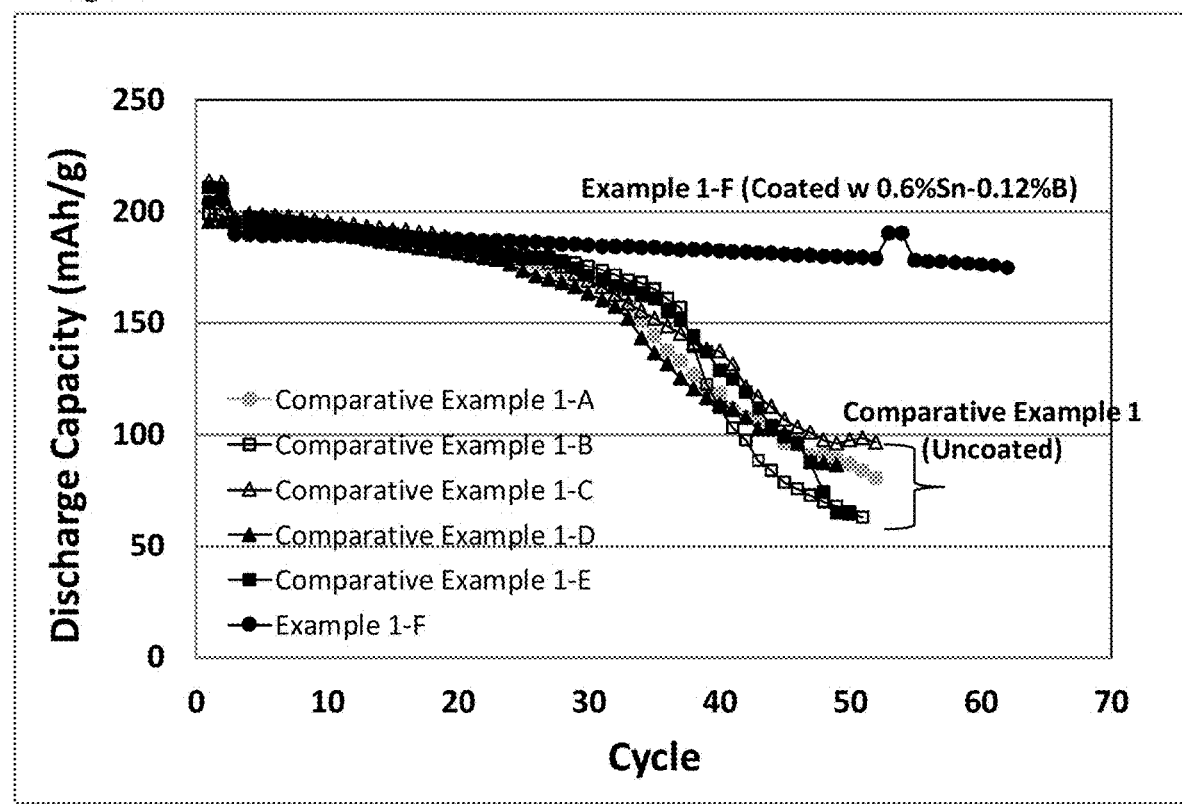
FIG. 1 shows specific cycle capacity (3V-4.6V) vs cycle number plots for the cells prepared from uncoated cathode materials (pristine and treated at different conditions from Comparative Example 1), and a Sn—B two component coated cathode material (Example 1-F) as comparison.

The material of this invention is a cathode material for Li-ion cells comprising a core of a layered $Li_{1+a}(Ni_{1-b-c}Co_bMn_c)O_2$ material with a surface coating of a $B_2O_3$ or $SnB_xO_{2+3x/2-y/2}F_y$ component; wherein $0 \leq x \leq 5$, $0 < y < 4+3x$; The core of the material of this invention may also be described as a cathode material in its initial discharged state. The coated material of this invention exhibits high capacity, long cycle life and high stability at voltages greater than 4.2V vs lithium. In one aspect of this invention the stabilizing coating is an ion-conductive layer.

According to one embodiment of the present application, the surface coating is a $B_2O_3$-coating, wherein relative to the total amount of the base active material, the weight percentage of B element is not more than 2 wt %.

According to one embodiment of the present application, the surface coating is a $SnO_{2-y/2}F_y$-coating, $0 < y < 4$, preferably, $0 < y \leq 2$, wherein relative to the total amount of the base active material, the weight percentage of Sn element is not more than 5 wt %.

In a preferred embodiment of the present application, the surface coating is a $SnB_xO_{2+3x/2-y/2}F_y$-coating; wherein $0 < x \leq 5$, $0 < y < 4+3x$, preferably, $0 < y \leq 2$, wherein relative to the total amount of the base active material, the weight percentage of B element is not more than 2 wt %, the weight percentage of Sn element is not more than 5 wt %. When the coating contains both B element and Sn element the cycle life of two components formulations is better than that of single component formulations. The inclusion of multiple components provides for decreased crystallinity or a decrease in crystalline domain size which is advantageous since Li-ion conduction is typically enhanced in amorphous or defect-rich regions and at grain boundaries.

The inventors of the present application also find that when the weight percent of Sn element is more than that of B element, a higher capacity, longer cycle life cathode material at high voltages (2-4.6V) will be got. Preferably, relative to the total amount of the base active material, the weight percentage of Sn element to the weight percentage of B element is 3:0.1-1.35, more preferably is 3:0.4-1.25, still more preferably is 3:0.4-0.8, most preferably is 3:0.6.

In another aspect of this invention, a method of preparing the material is provided wherein the core material is supplied as a powder and dry-mixed in the proper molar ratio with the components of the coating phase. The coating phase components or their precursors are added in the proper molar ratios to obtain a final coating composition within the coating compositional range of this invention at a total amount that is not more than 3 wt % of the core material. The mixture is fired at temperatures above 400° C. for 4 hours to 6 hours.

In another aspect of this invention a method of preparing the material is provided wherein the core material is supplied as a powder and wet mixed using a solvent such as water or methanol with the components of the coating phase or their precursors. The mixture is dried and then fired above 400° C. for 4 hours to 6 hours. When wet mixing is used, the amount of solvent can be just enough to dissolve the coating phase components or their precursors, i.e., according the solubility of the coating phase components or their precursors, the minimum amounts of solvent is required.

According to the method of preparing the material, the coating phase may also be formed by rapidly cooling the mixture from the firing temperature. The material of this invention may be used in Li-ion batteries as the cathode.

According to the present application, when both B element and Sn element are involved in the coating, no matter the mixing is dry-mixed or wet mixed, the core material can be mixed with the phase components and/or a precursor for the phase components directly. According to one preferred embodiment of the present application, the core material is first mixed with $B_2O_3$ or a precursor of $B_2O_3$ (e.g., $H_3BO_3$ and/or $HBO_2$) for a suitable time to gain a homologous phase, and then mix the homologous phase with $SnO_{2-y/2}F_y$ or a precursor of $SnO_{2-y/2}F_y$ (e.g., $SnF_2$) for a longer time to gain the product before firing.

The specific advantages of this material over the current art include the fact that the coating phase is insulating and stable to the electrolyte at high voltages and may minimize adverse reactions of the cathode material with the electrolyte at high voltages; it is Li-ion conductive and may minimize the impact of the coating layer on the material performance; it may allow for more uniform coating of the particles surface, and these compositions are chemically compatible with the active cathode material such that firing the materials together to make the coating layer does not adversely affect the structure or performance of the base active material. These unique combinations of characteristics lead to greatly improved stability of the layered type cathode materials of this invention at high voltages allowing for extended cycle life at high capacities.

EXAMPLES

Comparative Example 1

Uncoated Cathode Material $Li_{1+a}Ni_{1-b-c}Co_bMn_cO_2$

The uncoated cathode materials $Li_{1+a}Ni_{1-b-c}Co_bMn_cO_2$, with $a=0$, $b=0.2$, and $c=0.3$ ($Li_1Ni_{0.5}Co_{0.2}Mn_{0.3}O_2$, NCM523) powder, pristine and treated at different conditions as described in Table 1, were weighed out to prepare electrodes of the cathode material, acetylene black, graphite and polyvinylidene difluoride binder in the formulation of 90%/4%/2%/4%.

The electrodes fabricated above were cut to ⅝ diameter disks using a punch press and electrochemically characterized in CR2032 coin cells. A coin cell was assembled with a cathode fabricated from cathode material, a porous polyolefin separator, a lithium metal anode electrode, and an electrolyte of 1.2 M $LiPF_6$ in EC/DEC (ethylene carbonate/ethyl methyl carbonate) in a 3:7 ratio by weight. The coin cells were tested using 10 mA units of LAND Battery Testing System at 25° C. using a constant current charge and discharge between 3.0V 4.6V.

The comparisons of electrochemical performances between uncoated pristine material, uncoated pristine materials treated at different conditions (comparative example 1-A through 1-E), and coated material (Example 1-F) were shown in FIG. 1.

TABLE 1

Uncoated Cathode Material $LiNi_{0.5}Co_{0.2}Mn_{0.3}O_2$ (NCM523) Treated at Different Conditions

| Example | Base Material Weight (g) | Sn (wt %) | B (wt %) | Conditions |
|---|---|---|---|---|
| Comparative Example 1-A | 60 | 0 | 0 | Material as received (pristine) |
| Comparative Example 1-B | 60 | 0 | 0 | Vacuum dried at 85° C. for 12 hrs |
| Comparative Example 1-C | 60 | 0 | 0 | Fired at 400° C. for 5 hrs in air |
| Comparative Example 1-D | 60 | 0 | 0 | Mixed with about 10 g distilled water, vacuum dried at 85° C. for 12 hrs, then fired at 400° C. for 5 hrs in air |
| Comparative Example 1-E | 60 | 0 | 0 | Mixed with about 10 g methanol, vacuum dried at 85° C. for 12 hrs, then fired at 400° C. for 5 hrs in air |

Example 1

Two Components of Sn and B Coated Cathode Material $Li_{1+a}Ni_{1-b-c}Co_bMn_cO_2$ The cathode material $Li_{1+a}Ni_{1-b-c}Co_bMn_cO_2$, with a=0, b=0.2, and c=0.3 ($Li_1Ni_{0.5}Co_{0.2}Mn_{0.3}O_2$, NCM523) powder, the same as used in Comparative Example 1-A, was used as the base layered cathode material in this example of the method of this invention.

The process of two-component coating on the surface of the base material NCM523 was carried out through a solid-state reaction method, using tin fluoride ($SnF_2$) and boric acid ($H_3BO_3$) as coating agents. As one specific example, the coating of 0.6 wt % Sn and 0.12 wt % B relative to the total weight of the base material NCM523 is described. 60 grams of NCM523 were weighted and placed into a wide-mouth plastic jar. Approximately 25 grams of zirconia milling media cylinders were added to the jar. The amounts of $SnF_2$ and $H_3BO_3$ required to give a coating of 0.6 wt % Sn and 0.12 wt % B relative to the weight of NCM523, respectively, were calculated. From the reported solubility of $H_3BO_3$ and $SnF_2$ in water, the minimum amounts of water required to dissolve each compound were calculated. 0.4118 grams of boric acid was weighed out, and dissolved in 8.7392 grams of distilled water. This was added to the jar with the cathode material and milling media. The jar was rolled for 30 minutes using roll-miller. Meanwhile 0.4752 grams of tin fluoride were dissolved in 1.3575 grams of distilled water. The tin fluoride solutions were added to the jar, and tumbling was continued for 2 hours. The jars with contents were placed in a vacuum oven at approximately 85° C. to dry for 12 hours. Next the contents of the jar were placed in an alumina crucible and heated in air in a 400° C. oven for 5 hours. The final products were sieved through 50 μm using an Octagon 200 Test Sieve Shaker with Standard Test Sieve to remove large particles prior to coating the electrodes.

Two component coated cathode materials with other Sn and B weight percentages listed in Table 2 were made from the same method described above. The electrodes of the two component coated cathode materials were prepared, and electrochemically evaluated using the methods described in Comparative Example 1. The comparisons of electrochemical performances among materials coated with different Sn and B weight percentages were shown in FIG. 2 (Cycle capacity) and FIG. 3 (Cycle capacity retention).

TABLE 2

Two Components of Sn and B Coated Cathode Material $LiNi_{0.5}Co_{0.2}Mn_{0.3}O_2$ (NCM523) with Different Sn, B Coating Weight Percentages

| Example | Base Material Weight (g) | Sn (wt %) | B (wt %) | Conditions |
|---|---|---|---|---|
| Example 1-A | 60 | 0.2 | 0.08 | Mixed with about 10 g distilled water, vacuum dried at 85° C. for 12 hrs, then fired at 400° C. for 5 hrs in air |
| Example 1-B | 60 | 0.4 | 0.16 | Mixed with about 10 g distilled water, vacuum dried at 85° C. for 12 hrs, then fired at 400° C. for 5 hrs in air |
| Example 1-C | 60 | 0.6 | 0.24 | Mixed with about 10 g distilled water, vacuum dried at 85° C. for 12 hrs, then fired at 400° C. for 5 hrs in air |

TABLE 2-continued

Two Components of Sn and B Coated Cathode Material LiNi$_{0.5}$Co$_{0.2}$Mn$_{0.3}$O$_2$
(NCM523) with Different Sn, B Coating Weight Percentages

| Example | Base Material Weight (g) | Sn (wt %) | B (wt %) | Conditions |
|---|---|---|---|---|
| Example 1-D | 60 | 1.2 | 0.5 | Mixed with about 10 g distilled water, vacuum dried at 85° C. for 12 hrs, then fired at 400° C. for 5 hrs in air |
| Example 1-E | 60 | 0.6 | 0.08 | Mixed with about 10 g distilled water, vacuum dried at 85° C. for 12 hrs, then fired at 400° C. for 5 hrs in air |
| Example 1-F | 60 | 0.6 | 0.12 | Mixed with about 10 g distilled water, vacuum dried at 85° C. for 12 hrs, then fired at 400° C. for 5 hrs in air |

Example 2

Single Component of Sn Coated Cathode Material Li$_{1+a}$Ni$_{1-b-c}$Co$_b$Mn$_c$O$_2$ Tin fluoride (SnF$_2$) was used as a starting material to coat on the surface of the base cathode material Li$_{1+a}$Ni$_{1-b-c}$Co$_b$Mn$_c$O$_2$, with a=0, b=0.2, and c=0.3 (Li$_1$Ni$_{0.5}$Co$_{0.2}$Mn$_{0.3}$O$_2$, NCM523), the same as used in Comparative Example 1-A, to achieve a specific Sn coating weight percentage following a weight ratio of Sn over the base cathode materials (Table 3). As an example, to prepare a 0.2 wt % Sn coated LiNi$_{0.5}$Co$_{0.2}$Mn$_{0.3}$O$_2$ cathode material, 60 g of the base layered cathode material was weighed out, put into a container. To achieve a 0.2 wt % Sn coating on the surface of 60 g base layered cathode materials, 0.1584 g of SnF$_2$ was weighed out and dissolved in 0.4525 g distilled water. The solution of SnF$_2$ along with approximately 25 g zirconia milling media cylinders were added to the powder container. The mixture was mixed using roll-miller for 2 hours, and was vacuum dried at 85° C. for 12 hours. The final mixture was then fired in air at 400° C. for 5 hours.

Single component Sn coated cathode materials with other Sn weight percentages listed in Table 3 were made from the same method described above.

The electrodes of single component coated cathode materials from Example 2 (Sn coating) were prepared, and electrochemically evaluated using the methods described in Comparative Example 1. The comparisons of electrochemical performances between single component coated materials (Example 2-A through 2-C) and typical two component coated material (Example 1-F) were shown in FIG. 4 (Cycle capacity retention).

Example 3

Single Component of B Coated Cathode Material Li$_{1+a}$Ni$_{1-b-c}$Co$_b$Mn$_c$O$_2$ Boric acid (H$_3$BO$_3$) was used as a starting material to coat on the surface of the base cathode material Li$_{1+a}$Ni$_{1-b-c}$Co$_b$Mn$_c$O$_2$, with a=0, b=0.2, and c=0.3 Li$_1$Ni$_{0.5}$Co$_{0.2}$Mn$_{0.3}$O$_2$, (NCM523), the same as used in Comparative Example 1-A, to achieve a specific B coating weight percentage following a weight ratio of B over the base cathode materials (Table 4). As an example, to prepare a 0.08 wt % B coated LiNi$_{0.5}$Co$_{0.2}$Mn$_{0.3}$O$_2$ cathode material, 60 g of the base layered cathode material was weighed out, put into a container. To achieve a 0.08 wt % B coating on the surface of 60 g base layered cathode materials, 0.2745 g of H$_3$BO$_3$ was then weighed out and dissolved in 5.8262 g distilled water. The solution of H$_3$BO$_3$ along with approximately 25 g zirconia milling media cylinders were added to the powder container. The mixture was mixed using roll-miller for 2 hours, and was vacuum dried at 85° C. for 12 hours. The final mixture was then fired in air at 400° C. for 5 hours.

Single component B coated cathode materials with other B weight percentages listed in Table 4 were made from the same method described above.

The electrodes of single component coated cathode materials from Example 3 (B coating) were prepared, and electrochemically evaluated using the methods described in Comparative Example 1. The comparisons of electrochemical performances between single component coated materials (Example 3-A through 3-C) and typical two component coated material (Example 1-F) were shown in FIG. 4 (Cycle capacity retention).

TABLE 3

Single Component of Sn Coated Cathode Material LiNi$_{0.5}$Co$_{0.2}$Mn$_{0.3}$O$_2$
(NCM523) with Different Sn Coating Weight Percentages

| Example | Base Material Weight (g) | Sn (wt %) | B (wt %) | Conditions |
|---|---|---|---|---|
| Example 2-A | 60 | 0.2 | 0 | Mixed with about 10 g distilled water, vacuum dried at 85° C. for 12 hrs, then fired at 400° C. for 5 hrs in air |
| Example 2-B | 60 | 0.4 | 0 | Mixed with about 10 g distilled water, vacuum dried at 85° C. for 12 hrs, then fired at 400° C. for 5 hrs in air |
| Example 2-C | 60 | 0.6 | 0 | Mixed with about 10 g distilled water, vacuum dried at 85° C. for 12 hrs, then fired at 400° C. for 5 hrs in air |

TABLE 4

Single Component of B Coated Cathode Material $LiNi_{0.5}Co_{0.2}Mn_{0.3}O_2$ (NCM523) with Different B Coating Weight Percentages

| Example | Base Material Weight (g) | Sn (wt %) | B (wt %) | Conditions |
|---|---|---|---|---|
| Example 3-A | 60 | 0 | 0.08 | Mixed with about 10 g distilled water, vacuum dried at 85° C. for 12 hrs, then fired at 400° C. for 5 hrs in air |
| Example 3-B | 60 | 0 | 0.16 | Mixed with about 10 g distilled water, vacuum dried at 85° C. for 12 hrs, then fired at 400° C. for 5 hrs in air |
| Example 3-C | 60 | 0 | 0.24 | Mixed with about 10 g distilled water, vacuum dried at 85° C. for 12 hrs, then fired at 400° C. for 5 hrs in air |

Example 4

Two Components of 0.6 wt % Sn and 0.12 wt % B Coated Cathode Material $Li_{1+a}Ni_{1-b-c}Co_bMn_cO_2$ via Different Mixing Solvents and Firing Temperatures Two-component of 0.6 wt % Sn and 0.12 wt % B Coated $LiNi_{0.5}Co_{0.2}Mn_{0.3}O_2$ ($Li_1Ni_{0.5}Co_{0.2}Mn_{0.3}O_2$, NCM523) cathode materials via different mixing solvents of methanol or distilled water, and different firing temperatures of 400° C. or 600° C. (Table 5), were prepared following the same method described in Example 1. The electrodes of the coated cathode materials from this example were prepared, and electrochemically evaluated using the methods described in Comparative Example 1. The comparisons of electrochemical performances were shown in FIG. 5.

TABLE 5

Two Components of 0.6 wt % Sn and 0.12 wt % B Coated Cathode Material $LiNi_{0.5}Co_{0.2}Mn_{0.3}O_2$ (NCM523) via Different Processes

| Example | Base Material Weight (g) | Sn (wt %) | B (wt %) | Conditions |
|---|---|---|---|---|
| Example 4-A | 60 | 0.6 | 0.12 | Mixed with about 10 g methanol, vacuum dried at 85° C. for 12 hrs, then fired at 600° C. for 5 hrs in air |
| Example 4-B | 60 | 0.6 | 0.12 | Mixed with about 10 g distilled water, vacuum dried at 85° C. for 12 hrs, then fired at 600° C. for 5 hrs in air |
| Example 4-C | 60 | 0.6 | 0.12 | Mixed with about 10 g methanol, vacuum dried at 85° C. for 12 hrs, then fired at 400° C. for 5 hrs in air |
| Example 1-F | 60 | 0.6 | 0.12 | Mixed with about 10 g distilled water, vacuum dried at 85° C. for 12 hrs, then fired at 400° C. for 5 hrs in air |

FIG. 1 is a graphical representation of the cycle capacities (3V-4.6V) of uncoated cathode materials $Li_{1+a}Ni_{1-b-c}Co_bMn_cO_2$, with a=0, b=0.2, and c=0.3 (NCM523), pristine and treated at different conditions, comparing to a Sn—B two component coated cathode materials. While retaining the same capacity as that of the uncoated (pristine or treated) material, the Sn—B two component coated material shows great stability as cycling to 4.6V.

Figure 2:
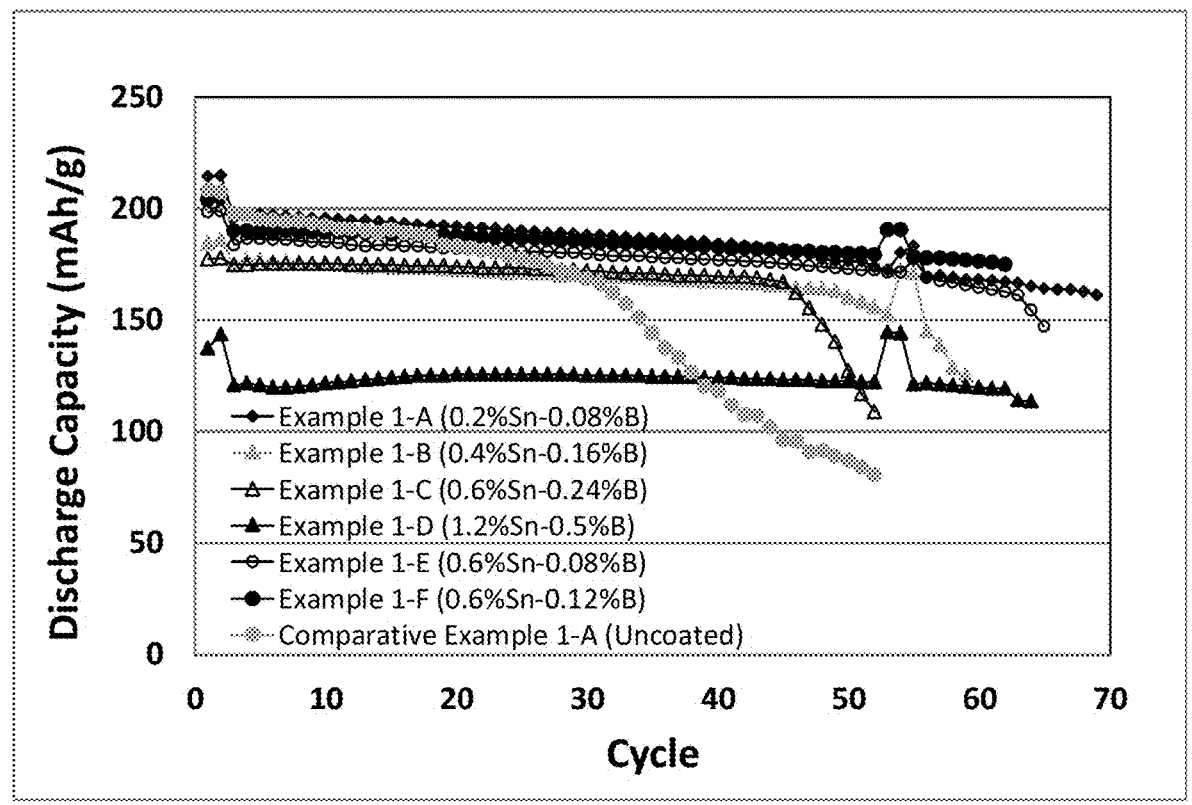
FIG. 2 shows specific cycle capacity (3V-4.6V) vs cycle number plots for the cells prepared from Sn—B two component coated cathode materials with different weight percentages of Sn and B relative to the total amount of the base active material, and an uncoated cathode material (pristine from Comparative Example 1-A) as comparison.
Figure 3:
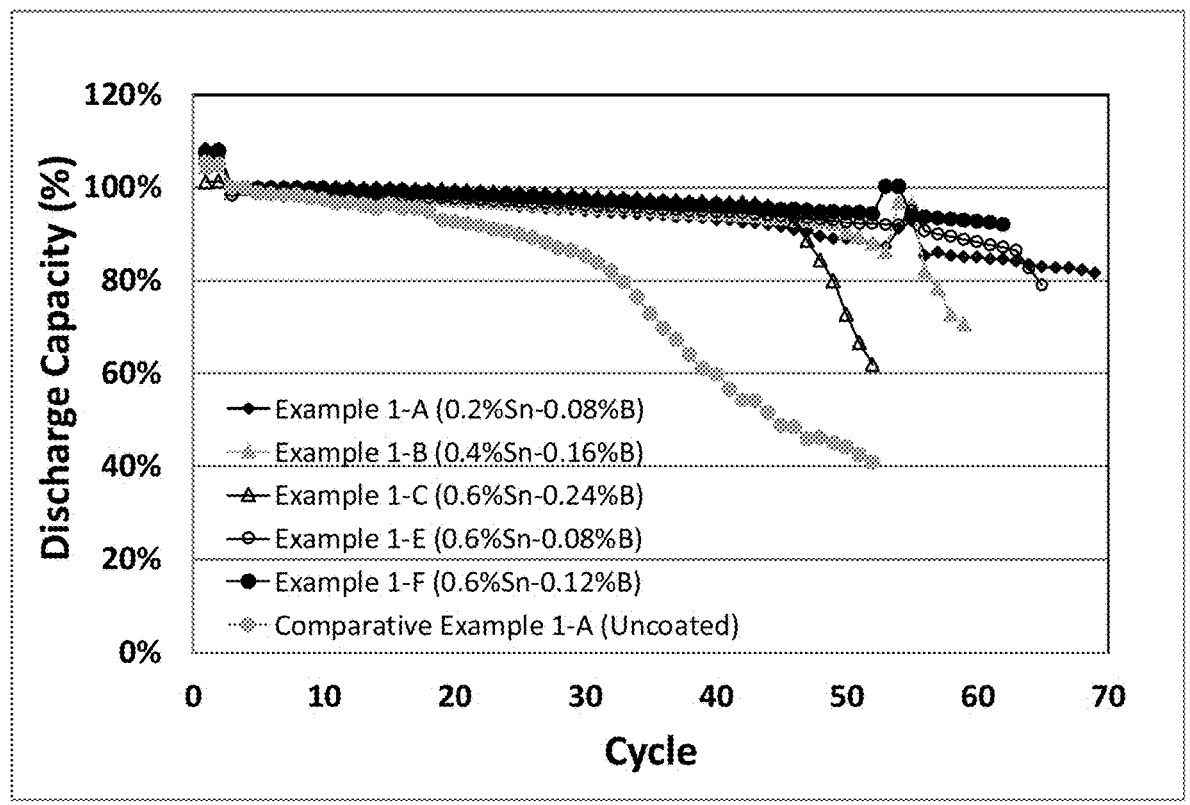
FIG. 3 shows specific cycle retentions (3V-4.6V) vs cycle number plots for the cells prepared from Sn—B two component coated cathode materials with different weight percentages of Sn and B relative to the total amount of the base active material, and an uncoated cathode material (pristine from Comparative Example 1-A) as comparison.

FIG. 2 and FIG. 3 are graphical representations of the cycle capacities, and the cycle retentions (3V-4.6V) of Sn—B two component coated cathode materials $Li_{1+a}Ni_{1-b-c}Co_bMn_cO_2$, with a=0, b=0.2, and c=0.3 (NCM523), and with different weight percentages of Sn and B relative to the total amount of the base active material compared with an uncoated cathode material (pristine from Comparative Example 1-A). In terms of capacity delivery and cycle retention, the best coated cathode material has been achieved from a two-component coating of 0.6 wt % Sn and 0.12 wt % B.

Figure 4:
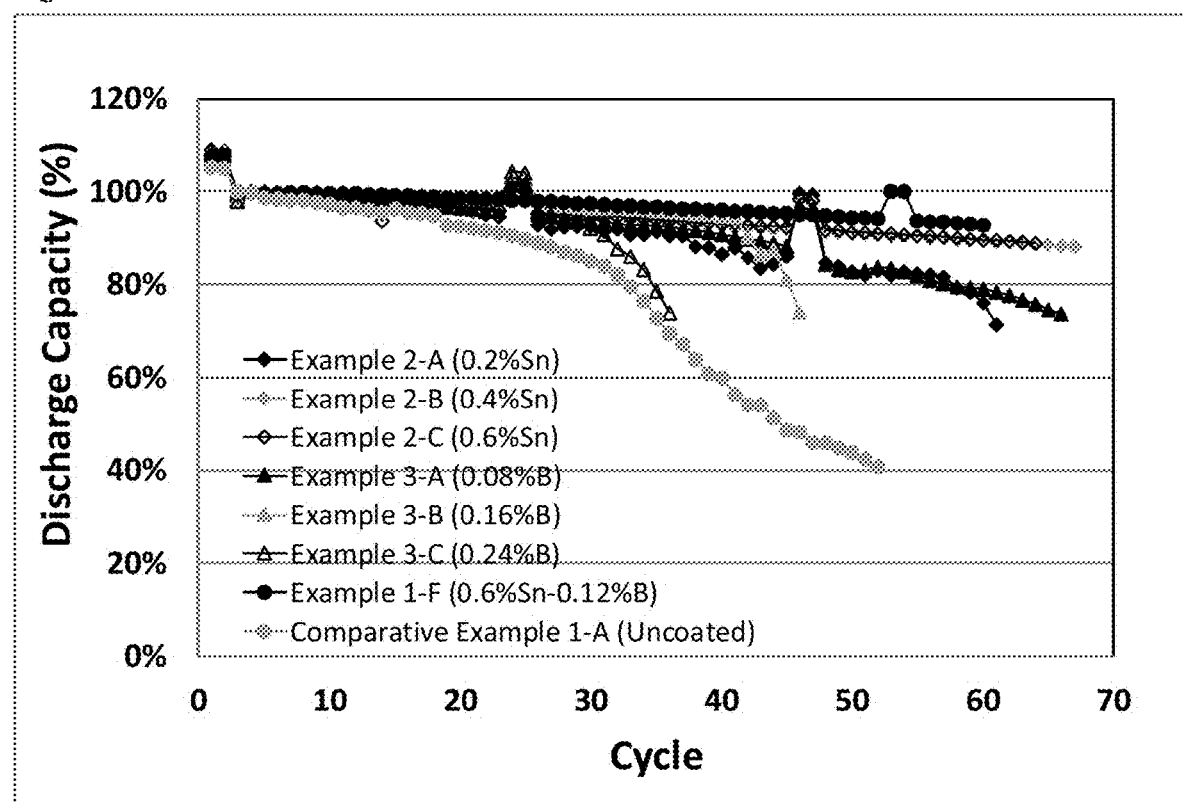
FIG. 4 shows specific cycle retentions (3V-4.6V) vs cycle number plots for the cells prepared from Sn or B single component coated cathode material with different weight percentages of Sn or B relative to the total amount of the base active material, and a Sn—B two component coated cathode material, and an uncoated cathode material (pristine from Comparative Example 1-A) as comparison.

FIG. 4 are graphical representations of the cycle retentions (3V-4.6V) of coated cathode materials $Li_{1+a}Ni_{1-b-c}Co_bMn_cO_2$, with a=0, b=0.2, and c=0.3 (NCM523), with Sn or B single component coatings and Sn—B two component coatings, compared with an uncoated cathode material (pristine from Comparative Example 1-A). Generally single component coatings show either fast capacity fading (from Sn coating) or lower capacity delivery (from B coating), whereas two component coatings, with a proper combination of Sn and B weight percentages relative to the total amount of the base active material (for example, here with 0.6 wt % Sn and 0.12 wt % B from Example 1-F), show improved high voltage stability while retaining similar capacity as that of pristine materials.

Figure 5:
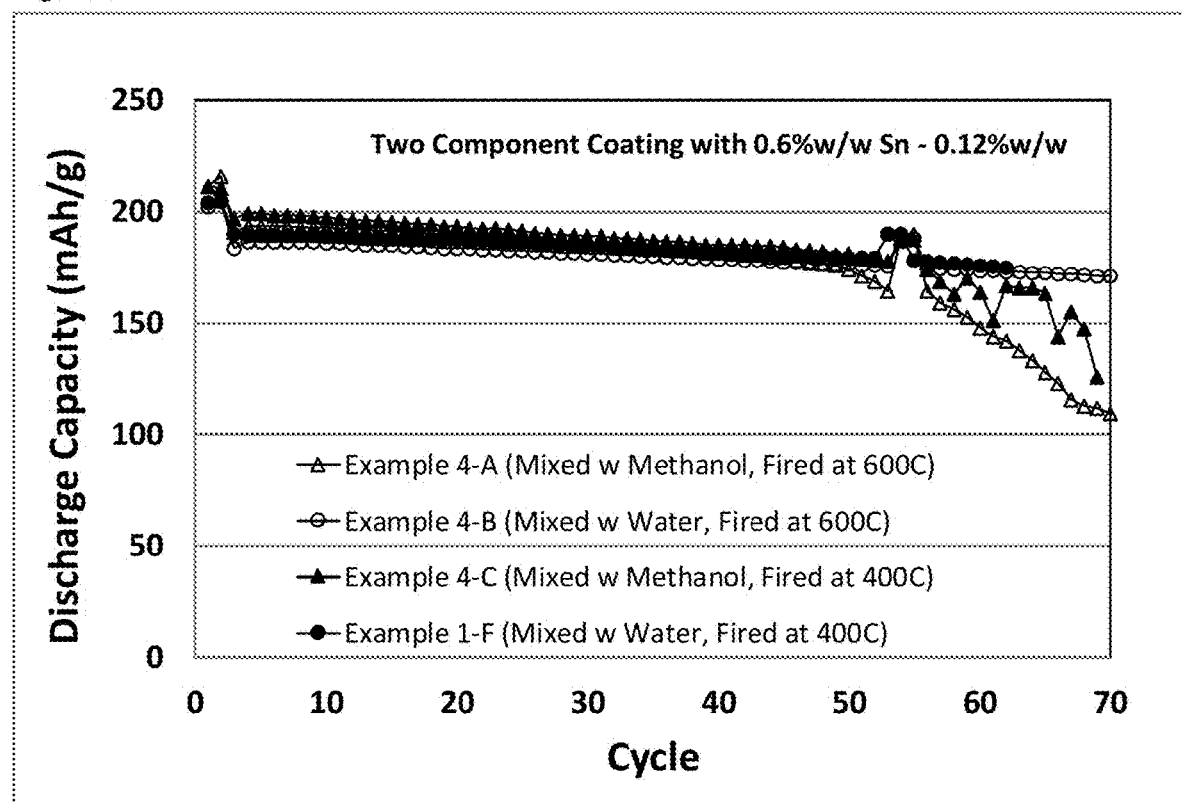
FIG. 5 shows specific cycle capacity (3V-4.6V) vs cycle number plots for the cells prepared from two component coatings of 0.6 wt % Sn and 0.12 wt % B relative to the total amount of the base active material via different processes of mixing with methanol or distilled water, and firing at 400° C. or 600° C.

FIG. 5 is a graphical representation of the cycle capacities (3V-4.6V) of coated cathode materials $Li_{1+a}Ni_{1-b-c}Co_bMn_cO_2$, with a=0, b=0.2, and c=0.3 (NCM523), with two component coatings of 0.6 wt % Sn and 0.12 wt % B relative to the total amount of the base active material via different processes of mixing with methanol or distilled water, and firing at 400° C. or 600° C. Coatings via mixing with small amount distilled water show better cycle stability than that with small amount methanol.

Thus the material of this invention provides for a cathode for Li-ion batteries with greater capacity and greater cycle life than the existing material.

The invention claimed is:

1. A composite for the cathode of a Li-ion battery comprising: a base active material represented by $Li_{1+a}(Ni_{1-b-c}Co_bMn_c)O_2$ wherein $0\leq a\leq 0.5$, $0\leq b\leq 0.4$, $0\leq c\leq 0.6$, with $b+c<1$; and a coating on the base active material comprised of a phase containing the components $SnB_xO_{2+3x/2-y/2}F_y$; wherein $0<x\leq 5$, $0<y<4+3x$; relative to the total amount of the base active material, the weight percentage of Sn element is 0.2 wt % to 1.2 wt %, the weight percentage of B element is 0.08 wt % to 0.5 wt %.

2. The composite of claim 1, wherein relative to the total amount of the base active material, the weight percentage of Sn element is 0.2 wt % to 0.8 wt %, the weight percentage of B element is 0.08 wt % to 0.16 wt %.

3. The composite of claim 2, wherein relative to the total amount of the base active material, the weight percentage of Sn element is 0.45 wt % to 0.75 wt %, the weight percentage of B element is 0.1 wt % to 0.14 wt %.

4. The composite of claim 1, wherein relative to the total amount of the base active material, the weight percentage of Sn element to the weight percentage of B element is 3:0.1-1.35.

5. The composite of claim 4, wherein relative to the total amount of the base active material, the weight percentage of Sn element to the weight percentage of B element is 3:0.4-1.25.

6. The composite of claim 5, wherein relative to the total amount of the base active material, the weight percentage of Sn element to the weight percentage of B element is 3:0.4-0.8.

7. The composite of claim 1, wherein relative to the total amount of the base active material, the content of the coating is 0.1 wt % to 3 wt %.

8. The composite of claim 7, wherein relative to the total amount of the base active material, the content of the coating is 0.2 wt % to 1.7 wt %.

9. The composite of claim 8, wherein relative to the total amount of the base active material, the content of the coating is 0.6 wt % to 0.8 wt %.

10. A Li-ion battery comprising a cathode, an anode and a separator sandwiched therebetween wherein the cathode contains a composite for the cathode of the Li-ion battery comprising:

a base active material represented by $Li_{1+a}(Ni_{1-b-c}Co_bMn_c)O_2$ wherein $0\leq a\leq 0.5$, $0\leq b\leq 0.4$, $0\leq c\leq 0.6$, with $b+c<1$; and a coating on the base active material comprised of a phase containing the components $SnB_xO_{2+3x/2-y/2}F_y$; wherein $0\leq x\leq 5$, $0<y<4+3x$;

relative to the total amount of the base active material, the weight percentage of Sn element is 0.2 wt % to 1.2 wt %, the weight percentage of B element is 0.08 wt % to 0.5 wt %.

11. A method for making the composite of claim 1 including the steps of:
(1) mixing the base active material with the phase components and/or a precursor for the phase components; and
(2) firing the mixture obtained in step (1);

the base active material is represented by $Li_{1+a}(Ni_{1-b-c}Co_bMn_c)O_2$ wherein $0\leq a\leq 0.5$, $0\leq b\leq 0.4$, $0\leq c\leq 0.6$, with $b+c<1$; and the phase components is $SnB_xO_{2+3x/2-y/2}F_y$; wherein $0<x\leq 5$, $0<y<4+3x$; relative to the total amount of the base active material, the weight percentage of Sn element is 0.2 wt % to 1.2 wt %, the weight percentage of B element is 0.08 wt % to 0.5 wt %.

12. The method of claim 11, wherein in step (1) the mixing is dry mixing.

13. The method of claim 11, wherein in step (1) the mixing is performed in a solvent selected from water and methanol.

14. The method of claim 11, wherein in step (1) the mixing is performed in the presence of a milling media.

15. The method of claim 14, wherein the milling media is zirconia.

16. The method of claim 11, wherein in step (1) the precursor of $B_2O_3$ is at least one of $H_3BO_3$ and $HBO_2$, the precursor of $SnO_{2-y/2}F_y$ is $SnF_2$.

17. The method of claim 11, wherein in step (1) mixing the base active material with $B_2O_3$ or a precursor of $B_2O_3$ for 20-40 min to obtain a mixture first, and then mixing the mixture with $SnO_{2-y/2}F_y$ or a precursor of $SnO_{2-y/2}F_y$ for 1 hour to 3 hours.

18. The method of claim 11, wherein in step (2) the firing is performed at a temperature of 400° C. to 600° C. for 4 hours to 6 hours.

* * * * *